US008958795B2

United States Patent
Tokgoz et al.

(10) Patent No.: US 8,958,795 B2
(45) Date of Patent: Feb. 17, 2015

(54) PROXIMITY BASED ACCESS CONTROL

(75) Inventors: Yeliz Tokgoz, San Diego, CA (US);
Chirag S. Patel, San Diego, CA (US);
Mehmet Yavuz, San Diego, CA (US);
Sanjiv Nanda, Ramona, CA (US); Peter H. Rauber, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 591 days.

(21) Appl. No.: 12/771,688

(22) Filed: Apr. 30, 2010

(65) Prior Publication Data

US 2010/0279686 A1    Nov. 4, 2010

Related U.S. Application Data

(60) Provisional application No. 61/175,344, filed on May 4, 2009, provisional application No. 61/184,271, filed on Jun. 4, 2009.

(51) Int. Cl.
| | | |
|---|---|---|
| *H04W 4/00* | (2009.01) | |
| *H04W 60/04* | (2009.01) | |
| *H04W 64/00* | (2009.01) | |
| *H04W 52/32* | (2009.01) | |
| *H04W 72/08* | (2009.01) | |

(52) U.S. Cl.
CPC .............. *H04W 60/04* (2013.01); *H04W 64/00* (2013.01); *H04W 52/325* (2013.01); *H04W 72/082* (2013.01)
USPC ...................... 455/435.1; 455/436; 455/432.1; 455/442; 455/456.1; 455/422.1

(58) Field of Classification Search
CPC ............................... H04W 60/00; H04W 64/00
USPC ................ 455/435.1, 436, 432.1, 442, 456.1, 455/422.1
See application file for complete search history.

(56) References Cited

U.S. PATENT DOCUMENTS

| | | | |
|---|---|---|---|
| 5,983,103 A * | 11/1999 | Sakaguchi | ................. 455/435.1 |
| 6,405,046 B1 | 6/2002 | Kumaran et al. | |
| 6,430,414 B1 | 8/2002 | Sorokine et al. | |
| 7,519,001 B2 | 4/2009 | Matsuda | |
| 7,519,011 B2 * | 4/2009 | Petrus et al. | ................... 370/280 |
| 8,181,079 B2 | 5/2012 | Gorokhov et al. | |

(Continued)

FOREIGN PATENT DOCUMENTS

| | | |
|---|---|---|
| CN | 101355812 A | 1/2009 |
| JP | 2000125345 A | 4/2000 |

(Continued)

OTHER PUBLICATIONS

International Search Report and Written Opinion -PCT/US2010/033629, International Search Authority—European Patent Office—Aug. 2, 2006.

*Primary Examiner* — Nghi H Ly

(57) ABSTRACT

A method for reducing interference to wireless communication devices is disclosed. A proximity of a wireless communication device to a base station is determined. The proximity of the wireless communication device is compared with a proximity threshold and based on the comparison, access to a femtocell may be granted to a restricted/non-CSG (closed subscriber group) wireless communication device. The method also includes causing a registration response to be sent to the wireless communication device based on the comparison.

49 Claims, 13 Drawing Sheets

(56) References Cited

U.S. PATENT DOCUMENTS

| | | |
|---|---|---|
| 2005/0136925 A1 | 6/2005 | Yamauchi |
| 2006/0155814 A1 | 7/2006 | Bennett et al. |
| 2009/0092111 A1 | 4/2009 | Horn et al. |
| 2009/0097451 A1 | 4/2009 | Gogic |
| 2009/0111499 A1 | 4/2009 | Bosch et al. |
| 2010/0048212 A1 | 2/2010 | Yavuz et al. |
| 2010/0135248 A1 | 6/2010 | Aramaki et al. |

FOREIGN PATENT DOCUMENTS

| | | |
|---|---|---|
| JP | 2003518889 A | 6/2003 |
| WO | 0149061 A1 | 7/2001 |
| WO | 2005060563 A2 | 7/2005 |
| WO | 2008139707 A1 | 11/2008 |
| WO | 2009022971 A1 | 2/2009 |
| WO | 2009039404 | 3/2009 |
| WO | 2009049032 | 4/2009 |

\* cited by examiner

PROXIMITY BASED ACCESS CONTROL

RELATED APPLICATIONS

This application is related to and claims priority from U.S. Provisional Patent Application Ser. No. 61/175,344, filed May 4, 2009, for "Proximity Based Access Control for Femto Cells."

This application is also related to and claims priority from U.S. Provisional Patent Application Ser. No. 61/184,271, filed Jun. 4, 2009, for "Proximity Based Access Control for Femto Cells."

TECHNICAL FIELD

The present disclosure relates generally to wireless communication systems. More specifically, the present disclosure relates to systems and methods for proximity based access control.

BACKGROUND

Wireless communication systems have become an important means by which many people worldwide have come to communicate. A wireless communication system may provide communication for a number of mobile stations, each of which may be serviced by a base station.

It may be beneficial to use localized base stations that provide service to a select group of mobile stations. These localized base stations may use less power and have smaller coverage areas than normal base stations. The localized base stations may then provide a mobile station with active voice/data access. As localized base stations continue to improve, more localized base stations will become prevalent.

Examples of localized base stations include femtocells, femto access points, picocells and home evolved NodeBs (HeNBs). Localized base stations may be referred to as femto access points without loss of generality. These localized base stations may be controlled by a user. For example, a localized base station may be purchased by an end user and placed in their home or office to increase wireless coverage. A localized base station may also be controlled by a service provider. For example, a service provider may place a localized base station in a public area with high traffic.

As a mobile station approaches a localized base station, the mobile station may detect the localized base station and attempt to access it by sending a registration request. The localized base station may then determine whether to allow access to this mobile station for different services such as a voice/data connection with the mobile station. Mobile stations that are near these localized base stations but not part of the select group may receive strong interference from the localized base stations. This strong interference, in some instances, may prevent a mobile station from obtaining access to a normal base station. As such, benefits may be realized by improving access constraints for localized base stations.

DETAILED DESCRIPTION

Figure 1:
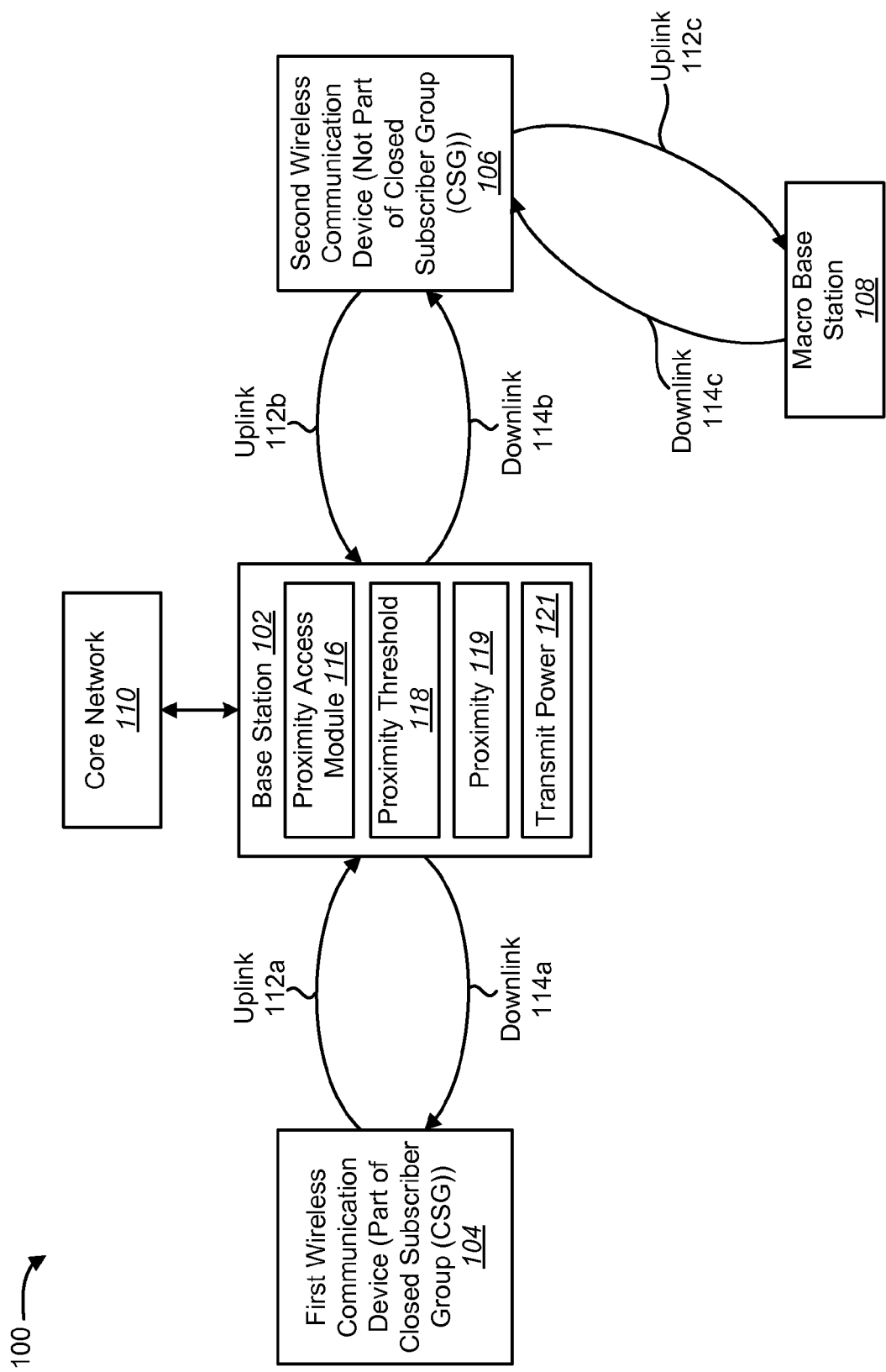
FIG. 1 shows a wireless communication system with multiple wireless devices.

A method for reducing interference to wireless communication devices is described. A proximity of a wireless communication device to a base station is determined. The proximity of the wireless communication device is compared with a proximity threshold. The method also includes causing a registration response to be sent to the wireless communication device based on the comparison.

The method may be performed by the base station or a core network. The base station may be a femto access point. The proximity of the wireless communication device may represent a pathloss from the base station to the wireless communication device. The pathloss may be less than the proximity threshold. Causing a registration response to be sent may include sending a registration response to the wireless communication device.

A registration request may be received from the wireless communication device. The wireless communication device may not be part of a closed subscriber group (CSG) corresponding to the base station. The registration request may be part of an access probe. The access probe may include received downlink pilot channel quality information.

The proximity may be a function of radio frequency (RF) downlink pathloss. The proximity may be determined using the received downlink pilot channel quality information and a pilot transmit power. A beacon may be broadcasted. The registration response may include a registration rejection or a registration acceptance. Active data/voice communication with the wireless communication device may be allowed.

A low power beacon may be broadcast during a first cycle. A first time period may correspond to the first cycle. A high power beacon may be broadcast during a second cycle. A second time period may correspond to the second cycle. A registration request may be received from a wireless communication device. The registration request may be received during the first time period. The registration response may be a registration acceptance.

The registration request may be passed to a core network along with an indication that the wireless communication device is a likely candidate for proximity based access. The registration request may be received during the second time period. The registration response may be a registration rejection. The registration request may be passed to a core network along with an indication that the wireless communication device is not a likely candidate for proximity based access.

The proximity may be determined using a record of uplink signal strengths measured during reception of access probes and a record of uplink signal strengths received on a pilot channel on subsequent calls from wireless communication devices that were previously allowed proximity based access. A registration rejection may be sent to the wireless communication device. Downlink transmit power may be reduced for a reduced transmit power period. The reduced transmit power period and/or transmit power may be adjusted based on how many registration requests are received during the reduced transmit power period. Reducing the transmit power may include reducing the transmit power on a pilot channel, on an overhead (control) channel or on all channels. Transmissions on beacon frequencies may be shut down for a shutdown period. The wireless communication device may be legacy user equipment (UE).

A wireless device configured for reducing interference to wireless communication devices is also described. The wireless device includes a processor, memory in electronic communication with the processor and instructions stored in the memory. The instructions are executable by the processor to determine a proximity of a wireless communication device to the wireless device. The instructions are also executable by the processor to compare the proximity of the wireless communication device with a proximity threshold. The instructions are further executable by the processor to send a registration response to the wireless communication device based on the comparison.

A wireless device configured for reducing interference to wireless communication devices is described. The wireless device includes means for determining a proximity of a wireless communication device to the wireless device. The wireless device also includes means for comparing the proximity of the wireless communication device with a proximity threshold. The wireless device further includes means for sending a registration response to the wireless communication device based on the comparison.

A computer-program product for reducing interference to wireless communication devices is also described. The computer-program product includes a computer-readable medium having instructions thereon. The instructions include code for determining a proximity of a wireless communication device to the wireless device. The instructions also include code for comparing the proximity of the wireless communication device with a proximity threshold. The instructions further include code for causing a registration response to be sent to the wireless communication device based on the comparison.

FIG. 1 shows a wireless communication system 100 with multiple wireless devices. Wireless communication systems 100 are widely deployed to provide various types of communication content such as voice, data, and so on. These systems may be multiple-access systems capable of supporting communication with multiple users by sharing the available system resources (e.g., bandwidth and transmit power). A wireless device may be a base station or a wireless communication device. A core network 110 is also illustrated in FIG. 1.

A base station is a station that communicates with one or more wireless communication devices. A base station may also be referred to as, and may include some or all of the functionality of, an access point, a broadcast transmitter, a NodeB, an evolved NodeB, etc. The term "base station" will be used herein. Each base station provides communication coverage for a particular geographic area. A base station may provide communication coverage for one or more wireless communication devices. The term "cell" can refer to a base station and/or its coverage area depending on the context in which the term is used.

A mobile station or device may be referred to as a "user equipment" (UE). A base station may be referred to as an evolved NodeB (eNB). A semi-autonomous base station may be referred to as a home evolved NodeB (HeNB). An HeNB may thus be one example of an eNB. The HeNB and/or the coverage area of an HeNB may be referred to as a femtocell, a picocell, an HeNB cell, a femto access point or a closed subscriber group (CSG) cell. Femto access point is used herein. Femto access points are low power base stations that extend the range of conventional wide area network base stations. Femto access points provide voice and high speed data service inside homes and offices for wireless communication devices supporting cellular radio communication techniques. Access to a femto access point depends on the kind of access control that the femto access point uses. With open access, any wireless communication device can access and receive service from a femto access point. With closed subscriber group (CSG) or restricted access, only members of the CSG are allowed to access and receive service from a femto access point.

Communications in a wireless system (e.g., a multiple-access system) may be achieved through transmissions over a wireless link. Such a communication link may be established via a single-input and single-output (SISO), multiple-input and single-output (MISO), or a multiple-input and multiple-output (MIMO) system. A MIMO system includes transmitter(s) and receiver(s) equipped, respectively, with multiple (NT) transmit antennas and multiple (NR) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

A MIMO system may support time division duplex (TDD) and frequency division duplex (FDD). In a TDD system, the uplink and downlink transmissions are on the same frequency region so that the reciprocity principle allows the estimation of the uplink channel from the downlink channel.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems or other multiple access techniques.

A wireless communication system employing the teachings herein may be designed to implement one or more standards, such as IS-95, cdma2000, IS-856, W-CDMA, time division synchronous code division multiple access (TD-SCDMA) and other standards. A CDMA network may implement a radio technology such as Universal Terrestrial Radio Access (UTRA), cdma2000 or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). The teachings herein may be implemented in a Third Generation Partnership Project (3GPP) Long Term Evolution (LTE) system, an Ultra-Mobile Broadband (UMB) system and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (IxRTT, 1xEV-DO RelO, RevA, RevB) technology and other technologies. For clarity, certain aspects of the techniques are described below for cdma2000, and cdma2000 terminology is used in much of the description below.

Low power base stations 102 such as home evolved NodeBs (HeNB), picocells and femtocells are used in addition to the normal base stations (a normal base station is referred to herein as a macro base station 108). A picocell may refer to a base station 102 controlled by the network operator that operates on a much smaller scale than a macro base station 108. A femtocell may refer to a base station 102 controlled by a consumer that operates on a much smaller scale than a macro base station 108. A femtocell may provide service to a closed subscriber group (CSG).

The base station 102 may communicate with one or more wireless communication devices 104, 106. A wireless communication device 104, 106 may also be referred to as, and may include some or all of the functionality of, a terminal, an access terminal, a user equipment (UE), a subscriber unit, a station, etc. A wireless communication device 104, 106 may be a cellular phone, a personal digital assistant (PDA), a wireless device, a wireless modem, a handheld device, a laptop computer, etc. A wireless communication device 104, 106 may communicate with zero, one or multiple base stations 102, 108 on the downlink 114a-c and/or uplink 112a-c at any given moment. The downlink 114 (or forward link) refers to the communication link from a base station 102, 108 to a wireless communication device 104, 106, and the uplink 112 (or reverse link) refers to the communication link from a wireless communication device 104, 106 to a base station 102.

A first wireless communication device 104 may be part of a closed subscriber group (CSG). A base station 102 such as an HeNB may restrict access to the base station 102 to wireless communication devices that are part of the closed subscriber group (CSG). With signaling only access, wireless communication devices that are not part of a closed subscriber group (CSG) are allowed to exchange signaling messages with the core network 110 using the HeNB. However, in signaling only access, the wireless communication devices that are not part of the closed subscriber group (CSG) are not allowed active mode voice/data service from the HeNB.

The second wireless communication device 106 may not be part of the closed subscriber group (CSG). The second wireless communication device 106 may instead communicate with a macro base station 108 via an uplink 112c and downlink 114c. However, the second wireless communication device 106 may be located within the coverage region of the base station 102. The second wireless communication device 106 may receive interference from the base station 102.

The base station 102 may also use a new access model based on the proximity to the base station 102 of a wireless communication device 106 that is not part of the closed subscriber group (CSG). With proximity based access, wireless communication devices 106 that are not part of the closed subscriber group (CSG) but are near a base station 102, and are thus likely to face severe interference from the base station 102, are allowed access to the base station 102. Proximity based access is an extension of closed subscriber groups (CSG). The base station 102 is restricted to most wireless communication devices that are far away from the base station 102, thereby providing closed subscriber group (CSG)-like access control to the base station 102 owner. It also prevents dead zones in the coverage of a macro base station 108 due to interference by providing service to wireless communication devices 106 that are not part of the closed subscriber group (CSG).

A base station 102 may broadcast beacons on frequencies used by the macro base station 108 where wireless communication devices are likely to be found. These beacons may be used to attract a wireless communication device to the base station 102. The base station 102 may use power calibration algorithms to balance the coverage provided by the base station 102 with the interference caused to the coverage area of the macro base station 108. However, it is not possible to completely eliminate the interference for a non closed subscriber group (CSG) wireless communication device 106 that is within the coverage region of the base station 102. For example, if the base station 102 is designed to provide coverage up to 80 decibels (dB) path loss from the base station 102, any wireless communication device that is not part of the closed subscriber group (CSG) (i.e., the second wireless communication device 106) may face interference on the base station 102 downlink 114b frequency and or beacon frequencies, depending on the transmit power 121 of the base station 102 on these frequencies. This interference may be especially severe when a wireless communication device 106 that is not part of the closed subscriber group (CSG) is very close to the base station 102. The interference may deprive the second wireless communication device 106 of coverage from the macro base station 108.

The base station 102 may include a proximity access module 116. The proximity access module 116 may be used by the base station 102 to minimize the impact of interference on wireless communication devices 106 that are not part of the closed subscriber group (CSG). For example, the proximity access module 116 may be used by the base station 102 to allow access to the base station 102 by the second wireless communication device 106 when the interference experienced by the second wireless communication device 106 is greater than a proximity threshold 118. The interference experienced by the second wireless communication device 106 may be directly correlated with the proximity 119 of the second wireless communication device 106 to the base station 102. The proximity 119 may be based on the pathloss between the base station 102 and the second wireless communication device 106.

When proximity based access cannot be provided to the second wireless communication device 106, the proximity access module 116 may adjust the transmit power 121 of the base station 102 on the downlink 114b frequency and/or beacon frequencies upon detecting a registration attempt by the second wireless communication device 106. The temporary reduction of transmit power 121 may reduce the interference experienced by the second wireless communication device 106.

The radio frequency (RF) pathloss criterion can additionally be augmented to account for the macro coverage the second wireless communication device 106 is experiencing to determine if the second wireless communication device 106 should be allowed access to the base station 102 or not. For example, if the base station 102 happens to be very close to the macro base station 108, then the second wireless communication device 106 may still receive adequate coverage from the macro base station 108 even when the second wireless communication device 106 is close to the base station 102. Thus, proximity based access may not be permitted.

Figure 2:
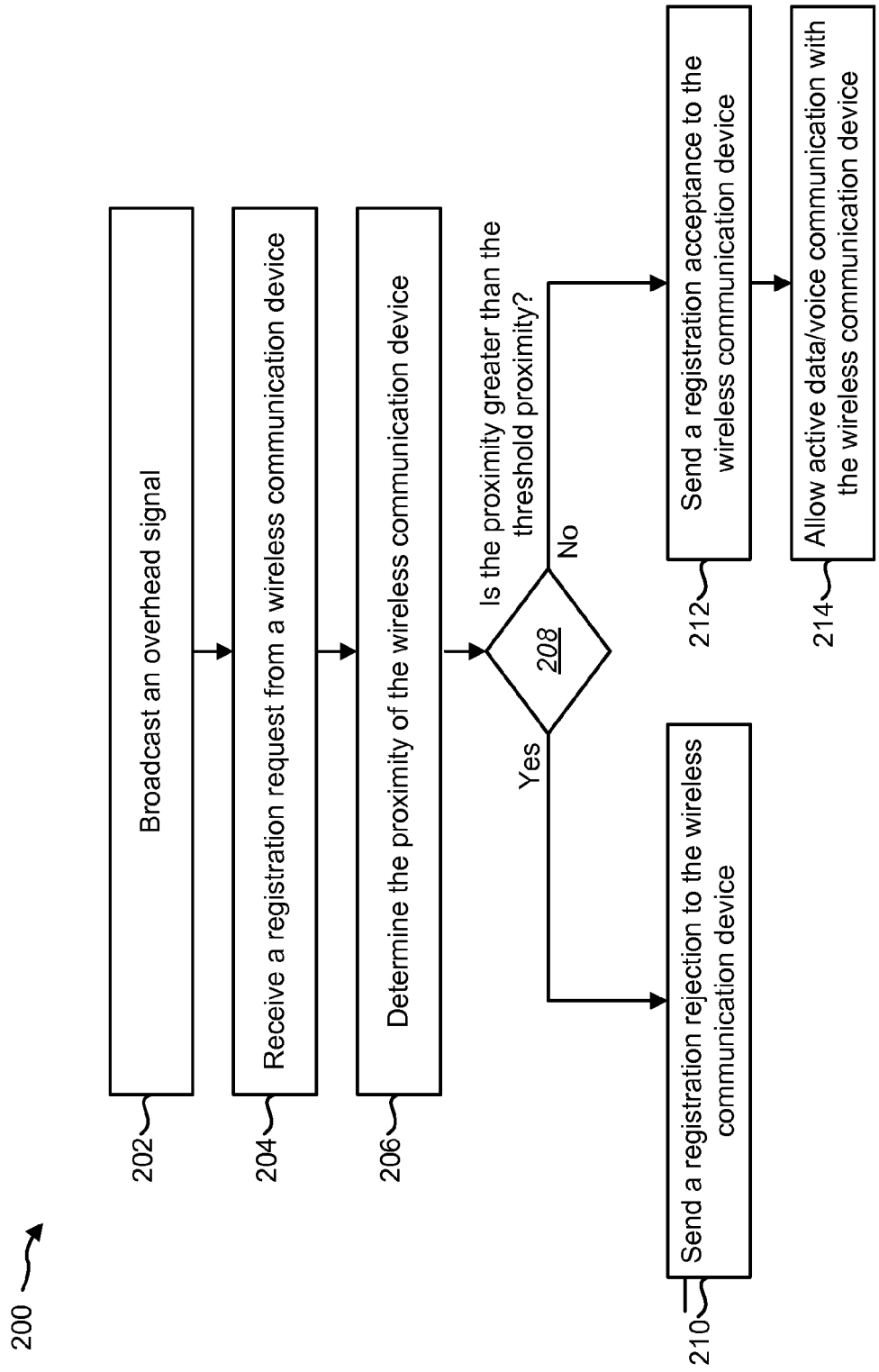
FIG. 2 is a flow diagram of a method for proximity based access control.

FIG. 2 is a flow diagram of a method 200 for proximity based access control. The method 200 may be performed by a base station 102. In one configuration, the base station 102 may be a femto access point. The base station 102 may broadcast 202 an overhead signal on the downlink 114 (forward link) frequency and/or beacon frequencies. The base station 102 may then receive 204 a registration request from a wireless communication device 106. The wireless communication device 106 may not be part of a closed subscriber group (CSG) corresponding to the base station 102.

The base station 102 may determine 206 the proximity 119 of the wireless communication device 106. The proximity 119 may be determined as a function of the radio frequency (RF) pathloss between the base station 102 and the wireless communication device 106. The base station 102 may then determine 208 whether the proximity 119 is greater than a proximity threshold 118. The proximity threshold 118 may be a predetermined value stored on the base station 102. For example, the proximity threshold 118 may be 60 dB. If the proximity 119 of the wireless communication device 106 is 70 dB (i.e., the pathloss from the base station 102 to the wireless communication device 106 is 70 dB), then the proximity 119 of the wireless communication device 106 would be greater than a proximity threshold 118 of 60 dB. Determining 208 whether the proximity 119 is greater than a proximity threshold 118 may include comparing the proximity 119 to the proximity threshold 118.

If the proximity 119 of the wireless communication device 106 is greater than the proximity threshold 118, the base station 102 may send 210 a registration rejection to the wireless communication device 106. In one configuration, the core network 110 may cause the base station 202 to send 210 the registration rejection to the wireless communication device 106 if the core network 110 makes decisions concerning proximity based access. If the proximity 119 of the wireless communication device 106 is not greater than the proximity threshold 118, the base station 102 may send 212 a registration acceptance to the wireless communication device 106. In one configuration, the core network 110 may cause the base station 102 to send 212 the registration acceptance to the wireless communication device 106. The base station 102 can then allow 214 active data/voice communication with the wireless communication device 106.

If the RF pathloss from a base station 102 to a wireless communication device 106 cannot be obtained (i.e., the pathloss cannot be obtained using access probes (e.g., in legacy cdma2000 devices)), then the alternative method is to make decisions concerning proximity based access on the transmit power of beacons. Proximity based access using the transmit power of beacons is discussed in additional detail below in relation to FIG. 4, FIG. 5 and FIG. 6.

A wireless communication device may send an access probe to a base station. Access probes are discussed in additional detail below in relation to FIG. 7. An access probe may include feedback such as the downlink pilot signal energy per chip (Ecp) or the pilot strength (Ecp/Io), which is the ratio of pilot energy per chip to the total receiver power (Io) and total received power. Based on the feedback, the base station may determine the downlink pathloss between the base station and the wireless communication device.

The base station may include a record of received uplink signal strengths measured during the reception of access probes from wireless communication devices that are not part of the closed subscriber group (CSG). The base station may also include a record of uplink signal strengths received on the pilot channel when wireless communication devices that are not part of the closed subscriber group (CSG) that were granted proximity based access make active calls with the base station. These records may be used to determine the downlink pathloss. Determining the downlink pathloss using these records is discussed in further detail below in relation to FIG. 7.

Figure 3:
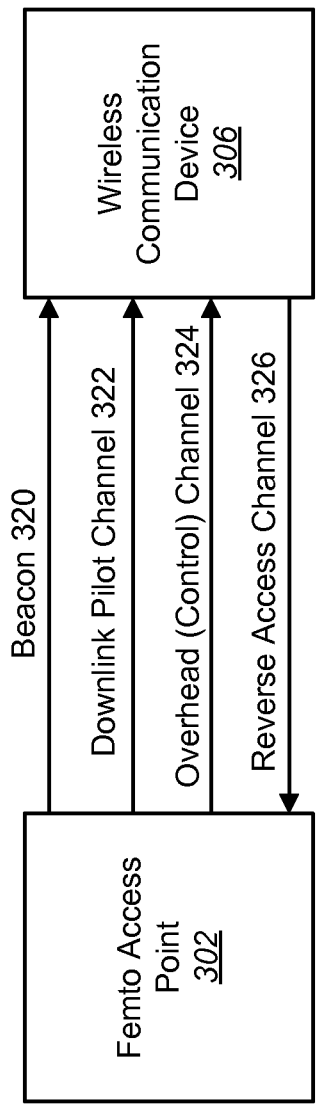
FIG. 3 illustrates some of the channels between a femto access point and a wireless communication device.

FIG. 3 illustrates some of the channels between a femto access point 302 and a wireless communication device 306. The femto access point 302 of FIG. 3 may be one configuration of the base station 102 of FIG. 1. The wireless communication device 306 of FIG. 3 may be one configuration of the second wireless device 106 of FIG. 1. Beacons 320 may be sent from a femto access point 302 to the wireless communication device 306. Multiple beacon frequencies may be used by the femto access point 302 to broadcast the beacons 320. The femto access point 302 may use a downlink pilot channel 322 to transmit information to the wireless communication device 306. A beacon 320 may direct a wireless communication device 306 to the downlink pilot channel 322. The femto access point 302 may also use an overhead (control) channel 324 to transmit information to the wireless communication device 306. The wireless communication device 306 may send communications back to the femto access point 302 using a reverse access channel 326. For example, the wireless communication device 306 may send registration requests to the femto access point 302 via the reverse access channel 326.

Figure 4:
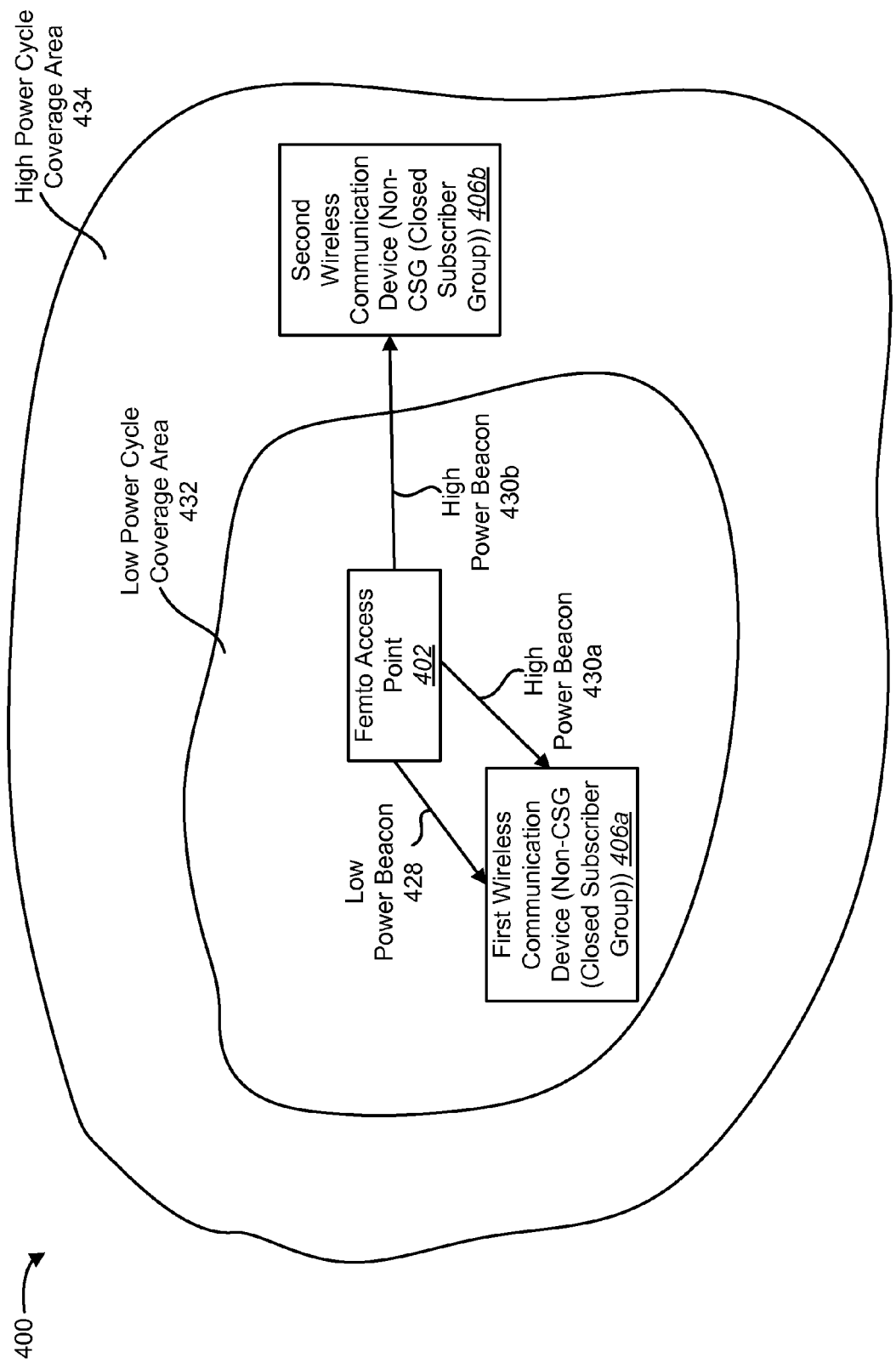
FIG. 4 is a block diagram illustrating a wireless communication system with multiple coverage areas around a femto access point.

FIG. 4 is a block diagram illustrating a wireless communication system 400 with multiple coverage areas 432, 434 around a femto access point 402. The femto access point 402 of FIG. 4 may be one configuration of the base station 102 of FIG. 1. The wireless communication system 400 may include a first wireless communication device 406a and a second wireless communication device 406b. The wireless communication devices 406 of FIG. 4 may be one configuration of the second wireless communication device 106 of FIG. 1. The first wireless communication device 406a and the second wireless communication device 406b may each not be part of a closed subscriber group (CSG) corresponding to the femto access point 402.

As discussed above in relation to FIG. 2, the transmit power of a beacon may be used to determine the pathloss/proximity of a wireless communication device 406. To do this, a base station 402 may transmit a low power beacon 428 during one time period and a high power beacon 430 during another time period. A timing diagram is illustrated below in relation to FIG. 5. Depending on whether a registration request is received following a low power beacon 428 or a high power beacon 430, the base station 402 may determine the pathloss/proximity of a wireless communication device 406 sending the registration request. The use of a low power beacon 428 creates a low power cycle coverage area 432 around the femto access point 402. Similarly, the use of a high power beacon 430 creates a high power cycle coverage area 434 around the femto access point 402.

The area within the low power cycle coverage area 432 may represent proximities 119 of wireless communication devices 406 that are less than a proximity threshold 118 of the femto access point 402. Because the pathloss is dependent on radio frequency (RF) and geographic conditions, a coverage area 432, 434 may not be a perfect circle. The area within the high power cycle coverage area 434 that is not also covered by the low power cycle coverage area 432 may represent proximities 119 of wireless communication devices 406 that are greater than the proximity threshold 118 of the femto access point 402 but still within the range of the femto access point 402.

The femto access point 402 may broadcast a low power beacon 428. Because the first wireless communication device 406a is within the low power cycle coverage area 432, the first wireless communication device 406a may receive the low power beacon 428. Because the second wireless communication device 406b is outside of the low power cycle coverage area 432, the second wireless communication device 406b may not receive the low power beacon 428. The femto access point 402 may also transmit a high power beacon 430. Because both the first wireless communication device 406a and the second wireless communication device 406b are within the high power cycle coverage area 434, both the first wireless communication device 406a and the second wireless communication device 406b may receive the high power beacon 430a-b. The use of high power beacons 430 and low power beacons 428 to determine the proximity 119 of wireless communication devices 406 is discussed in further detail below in relation to FIG. 5.

As an example, the low power cycle coverage area 432 may be a 50 dB pathloss from the femto access point 402. The proximity threshold 118 may thus be set at 50 dB. The high power cycle coverage area 434 may be a 90 dB pathloss from the femto access point 402.

Figure 5:
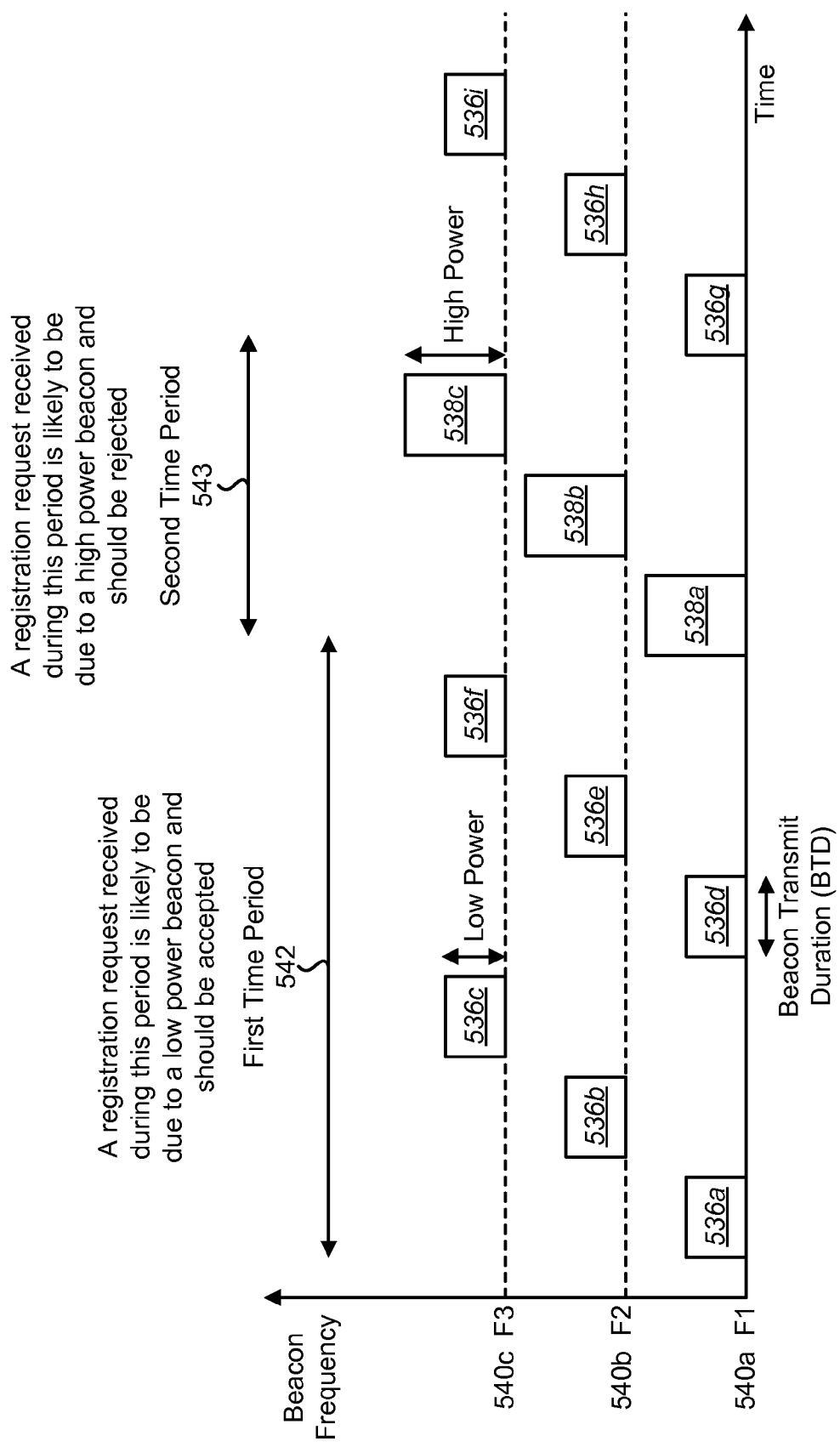
FIG. 5 illustrates the transmission of low power beacons and high power beacons.

FIG. 5 illustrates the transmission of low power beacons 536 and high power beacons 538. Low power beacons 536 and high power beacons 538 may be transmitted by a femto access point 402. To support proximity based access, layered beacon design may be used to detect the presence of a wireless communication device 406 and the proximity 119 of the wireless communication device 406. In layered beacon design, beacons may be radiated on all beacon frequencies 540a-c with a low transmit power most of the time and radiated on all beacon frequencies 540a-c with a high transmit power occasionally. Layered beacon design was disclosed in United States Patent Application Number PCT-US2009/054,544 and is hereby incorporated for reference. A beacon may be transmitted on multiple beacon frequencies 540. For example, a beacon may be transmitted on a first beacon frequency 540a, a second beacon frequency 540b or a third beacon frequency 540c.

A first low power beacon 536a may be radiated on the first beacon frequency 540a. Each radiated beacon (i.e., both low power beacons 536 and high power beacons 538) may be radiated for a beacon transmit duration (BTD). After the first low power beacon 536a, a second low power beacon 536b may be radiated on the second beacon frequency 540b. A third low power beacon 536c may then be radiated on the third beacon frequency 540c. A fourth low power beacon 536d may then be radiated on the first beacon frequency 540a, followed by a fifth low power beacon 536e on the second beacon frequency 540b and a sixth low power beacon 536f on the third beacon frequency 540c.

The femto access point 402 may then radiate a first high power beacon 538a on the first beacon frequency 540a, followed by a second high power beacon 538b on the second beacon frequency 540b and a third high power beacon 538c on the third beacon frequency 540c. The femto access point 402 may then transmit a seventh low power beacon 536g on the first beacon frequency 540a, followed by an eighth low power beacon 536h on the second beacon frequency 540b and a ninth low power beacon 536i on the third beacon frequency 540c. The femto access point 402 may thus alternate between a low power cycle and a high power cycle.

A low power cycle may include less than six low power beacon 536 transmissions. A low power cycle may also include more than six low power beacon transmissions 536. A high power cycle may include less than three high power beacon 538 transmissions. A high power cycle may also include more than three high power beacon 538 transmissions.

As an example, high power beacons 538 can be radiated every 0.5 to 2 minutes while low power beacons 536 are radiated the rest of the time. The low power cycle may minimize interference while the high power cycle ensures that wireless communication devices 406 in the far corners of the coverage area for the femto access point 402 are attracted to the femto access point 402.

A first time period 542 may correspond to the low power cycle and a second time period 543 may correspond to the high power cycle. The first time period 542 covers low power beacon 536 transmissions on one or more beacon frequencies 540 while the second time period 543 covers high power beacon 538 transmissions on one or more beacon frequencies 540.

Once a wireless communication device 406 detects a beacon, the wireless communication device 406 may be redirected to the femto access point 402 downlink 114 frequency through overhead messages. The wireless communication device 406 may then detect the femto access point 402 downlink pilot 322. Alternatively, the presence of a beacon on a particular beacon frequency 540 can trigger a wireless communication device 406 to search other frequencies and thereby detect the femto access point 402 downlink pilot 322 and/or other overhead channels. Upon detecting the femto access point 402 downlink pilot 322 and/or other overhead channels, a wireless communication device 406 may send a registration request to the femto access point 402 using the reverse access channel 326. The femto access point 402 and/or the core network 110 may accept or reject the registration request depending on either whether the wireless communication device 406 belongs to the closed subscriber group (CSG) or on the proximity 119 of the wireless communication device 406.

During the first time period 542, registration requests that are received are likely to be due to detection of a low power beacon 536 (i.e., the registration requests were triggered by the low power beacon 536) and should be accepted. This is because the proximity 119 of the wireless communication device 406 sending a registration request during the first time period 542 is within the low power cycle coverage area 432. During the second time period 543, registration requests that are received are likely to be due to a high power beacon 538 and should be rejected. This is because the proximity 119 of the wireless communication device 406 sending a registration request during the second time period 543 is within the high power cycle coverage area 434 but not within the low power cycle coverage area 432. Thus, when the femto access point 402 receives a registration request, the femto access point 402 can determine the power level used on beacon frequencies 540 in a short interval prior to receiving the registration request to approximate the proximity 119 of the wireless communication device 406 sending the registration request.

As an example, consider a cdma2000 1xRTT femtocell as the femto access point 402. The beacon transmit duration (BTD) on each beacon frequency 540 may be approximately 0.5 seconds, after which the beacon then hops to another beacon frequency 540. A 1xRTT mobile may read overhead messages sent on beacon channels and tune to the femtocell's downlink frequency. The 1xRTT mobile may detect the downlink pilot, start reading overhead messages and send an access probe to perform registration with the femtocell. The access probe may include a registration request. Access probes are discussed in additional detail below in relation to FIG. 7.

Reading all overhead messages on a femtocell downlink frequency can take approximately 1 to 1.5 seconds after which registration is performed. Thus, the femtocell may need to determine whether a high power beacon 538 or a low power beacon 536 was radiated approximately 2 seconds before the access probe was received. An additional time margin may be used to avoid erroneous decisions. In one configuration, a time window of width ~2 seconds centered at ~1 seconds before the access probe was received may be used to determine if the registration was due to detection of a low power beacon 536 or a high power beacon 538.

To ensure reliability, the layered beacon waveform may be carefully crafted. For example, a low power beacon 536 may be sent on all beacon frequencies 540 serially and then a high power beacon 538 may be sent on all beacon frequencies 540 serially. Thus, no matter from which beacon frequency 540 the wireless communication device 406 was redirected to the femtocell downlink frequency, the beacon power prior to the registration request can be determined with reasonable accuracy. The reliability can be further increased by determining which frequency (referred to herein as the camping frequency) the wireless communication device 406 was originally idle on while communicating with the macro base station 108 based on the unique identity (e.g., International Mobile Subscriber Identity (IMSI)) of the wireless communication device and the procedures specified in the relevant standards. The femto access point 402 may then use the beacon power level transmitted (high or low) on that particular frequency for estimating the proximity 119 of the wireless communication device 406.

Figure 6:
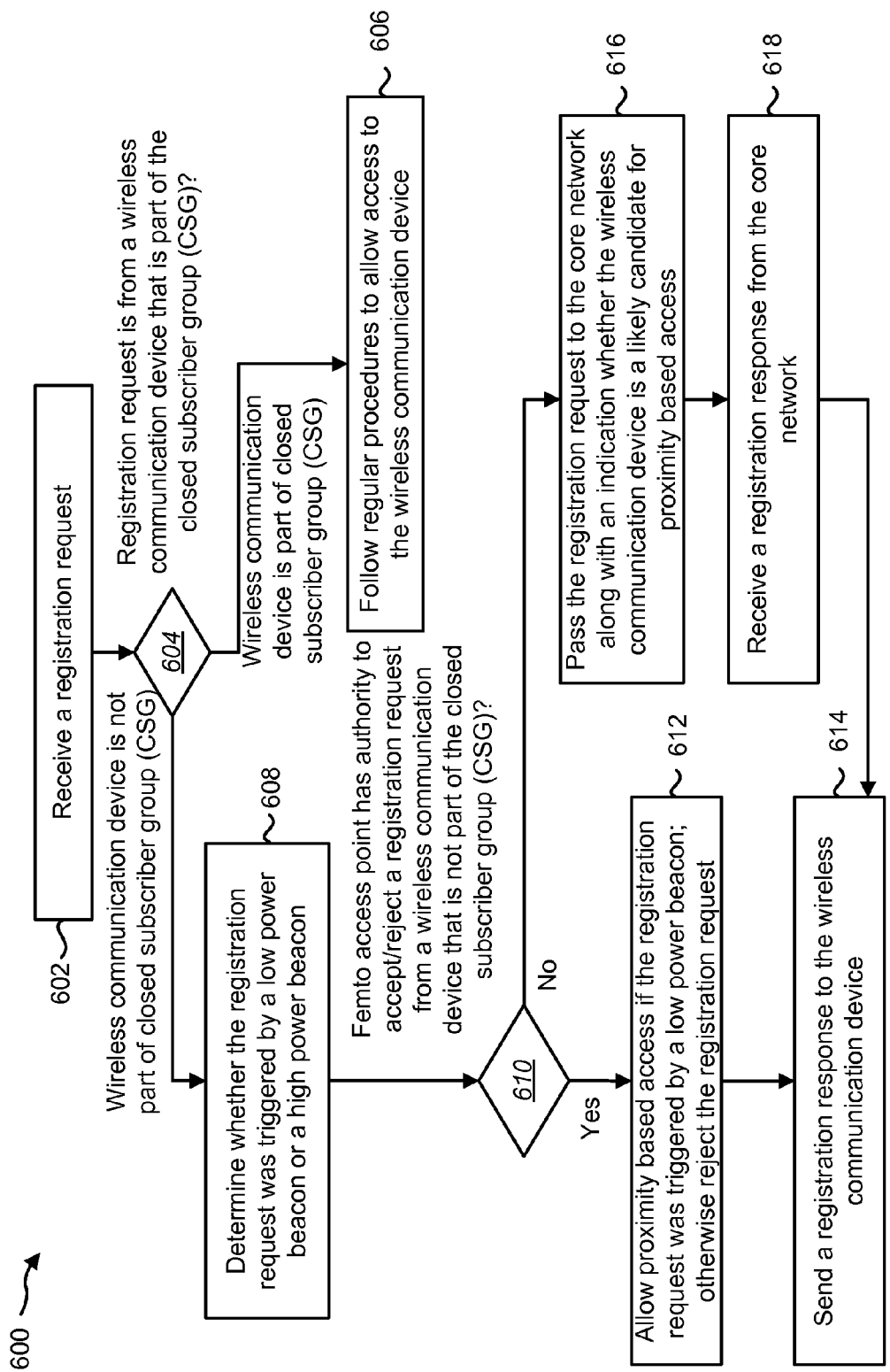
FIG. 6 is a flow diagram of a more detailed method for proximity based access control.

FIG. 6 is a flow diagram of a more detailed method 600 for proximity based access control. The method 600 may be performed by a femto access point 402. The femto access point 402 may receive 602 a registration request. The femto access point 402 may then determine whether the registration request is from a wireless communication device 406 that is part of the closed subscriber group (CSG). If the wireless communication device 406 is part of the closed subscriber group (CSG), the femto access point may follow regular procedures to allow access to the wireless communication device 406.

If the wireless communication device 406 is not part of the closed subscriber group (CSG), the femto access point 402 may determine 608 whether the registration request was triggered by a low power beacon 536 or a high power beacon 538. The femto access point 402 may then determine whether the femto access point 402 has authority to accept/reject a registration request from a wireless communication device 406 that is not part of the closed subscriber group (CSG).

If the femto access point 402 does have the authority to accept/reject a registration request from a wireless communication device 406 that is not part of the closed subscriber group (CSG), the femto access point 402 may allow 612 proximity based access if the registration request was triggered by a low power beacon 436 and reject the registration request otherwise (e.g., if the registration request was triggered by a high power beacon 438). The femto access point 402 may then send 614 a registration response (a registration acceptance or a registration rejection) to the wireless communication device 406.

If the femto access point 402 does not have the authority to accept/reject a registration request from a wireless communication device 406 that is not part of the closed subscriber group (CSG), the femto access point 402 may pass 616 the registration request to the core network 110 along with an indication of whether the wireless communication device 406 is a likely candidate for proximity based access (i.e., whether the registration request was triggered by a low power beacon 436 or by a high power beacon 438. The femto access point 402 may then receive 618 a registration response from the core network 110. The registration response may indicate to the femto access point 402 whether to send a registration acceptance or a registration rejection to the wireless communication device 406. The femto access point 402 may then send 614 a registration response to the wireless communication device 406.

Figure 7:
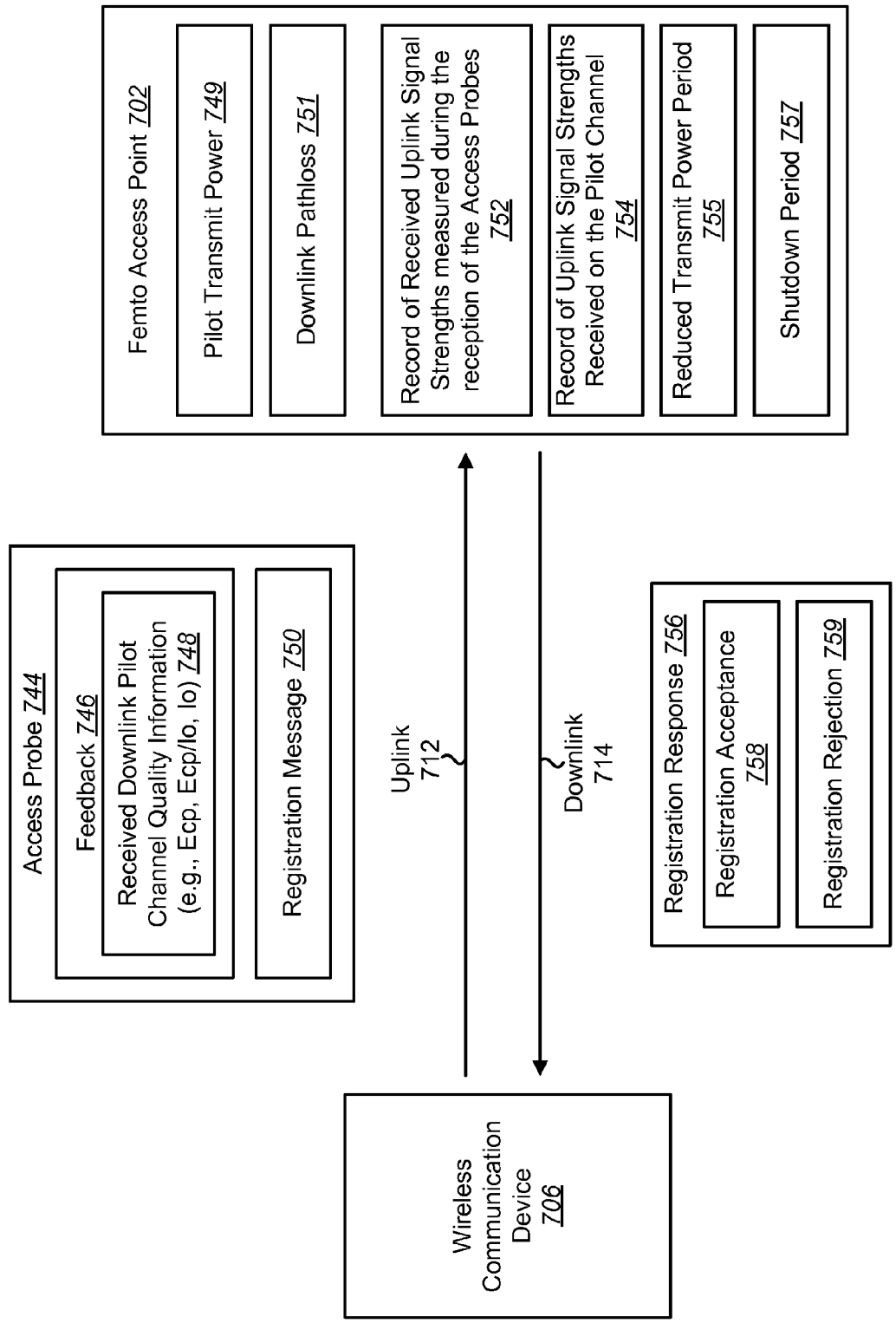
FIG. 7 illustrates communications between a wireless communication device and a femto access point.

FIG. 7 illustrates communications between a wireless communication device 706 and a femto access point 702. The wireless communication device 706 of FIG. 7 may be one configuration of the second wireless communication device 106 of FIG. 1. The femto access point 702 of FIG. 7 may be one configuration of the base station 102 of FIG. 1. The wireless communication device 706 may send an access probe 744 to the femto access point 702 via an uplink 712. The access probe 744 may include feedback 746. The feedback 746 may include received downlink pilot channel quality information 748 such as the downlink pilot signal energy per chip (Ecp) and/or the pilot strength (Ecp/Io). As discussed above, the pilot strength (Ecp/Io) is the ratio of pilot energy per chip to the total receiver power (Io) and total received power. The access probe 744 may also include a registration message 750. The registration message 750 may be a registration request. A new field can be defined in the registration message 750 to include received downlink pilot channel quality information 748 such as the signal energy per chip (Ecp) and/or pilot strength (Ecp/Io) if such information does not exist in the standards already.

An access probe 744 may not always include the required information. For example, in cdma2000, access probes 744 include the pilot strength (Ecp/Io) but not the received downlink pilot signal energy per chip (Ecp). To determine the downlink pathloss, both received downlink pilot signal energy per chip (Ecp) and the pilot strength (Ecp/Io) are needed.

The femto access point 702 may receive the access probe 744 from the wireless communication device 706. The femto access point 702 knows its own downlink pilot transmit power (Ecp_tx) 749. Based on the feedback 746 from the wireless communication device 706 and the pilot transmit power 749, the femto access point 702 may determine the downlink pathloss 751 between the femto access point 702 and the wireless communication device 706, as the difference between the pilot energy per chip (Ecp) obtained from the access probe 744 and the downlink pilot transmit power (Ecp_tx) 749. If the access probe 744 reports both the pilot strength (Ecp/Io) and the total receiver power Io, then the downlink pilot energy per chip (Ecp) can be derived and used to compute the downlink pathloss 751. The femto access point 702 can then use the downlink pathloss 751 to decide whether to allow proximity based access to the wireless communication device 702. The downlink pathloss 751 may also be referred to as the proximity 119.

The femto access point 702 may include a record 752 of received uplink signal strengths measured during the reception of access probes 744 from wireless communication devices 706 that are not part of the closed subscriber group (CSG). The femto access point may also include a record 754 of uplink signal strengths received on the pilot channel when wireless communication devices 706 who were granted proximity based access make active calls with the femto access point 702. The femto access point 702 may use the records 752, 754 to improvise proximity detection by self-learning. For example, by gathering long term information on the uplink signal strength expected from nearby wireless communication devices 706, the femto access point 702 may make decisions for proximity based access. If the received uplink signal strength when an access probe from a wireless communication device that is not part of the closed subscriber group (CSG) is received exceeds the expected uplink signal strength, then proximity based access may be granted.

The femto access point 702 may also determine the downlink pathloss 751 to a wireless communication device 706 that was granted proximity access by requesting forward link pilot strength measurement reports from the wireless communication device 706 during an active call. Using this pathloss information, the femto access point can decide whether the decision to grant access was correct or not. This information can be used to refine proximity based access for future use. For example, if the femto access point 702 determines that wireless communication devices that are not part of the closed subscriber group (CSG) were usually at a higher pathloss than the proximity threshold 118 after they were granted proximity based access, then the femto access point 702 can reduce the proximity threshold 118 (i.e., the pathloss within which proximity based access is granted to avoid erroneous decisions in the future).

The femto access point 702 may include a reduced transmit power period 755 and a shutdown period 757. The reduced transmit power period 755 may refer to the amount of time the femto access point 702 reduces forward link transmit power on one or more forward link channels after sending a registration rejection 759 to a wireless communication device. The transmit power reduction may be applied on the femto access point forward link frequency and/or beacon frequencies. The shutdown period 757 refers to the amount of time the femto access point 702 discontinues transmitting beacons after sending a registration rejection 759. The shutdown may also be applied on the femto access point downlink frequency, if there is no closed subscriber group (CSG) wireless communication device connected to the femto access point 702. The reduced transmit power period 755 is discussed in further detail below in relation to FIG. 9. The shutdown period 757 is discussed in further detail below in relation to FIG. 10. The femto access point 702 may send a registration response 756 to the wireless communication device 706 via the downlink 714. The registration response 756 may include a registration acceptance 758 or a registration rejection 759.

Figure 8:
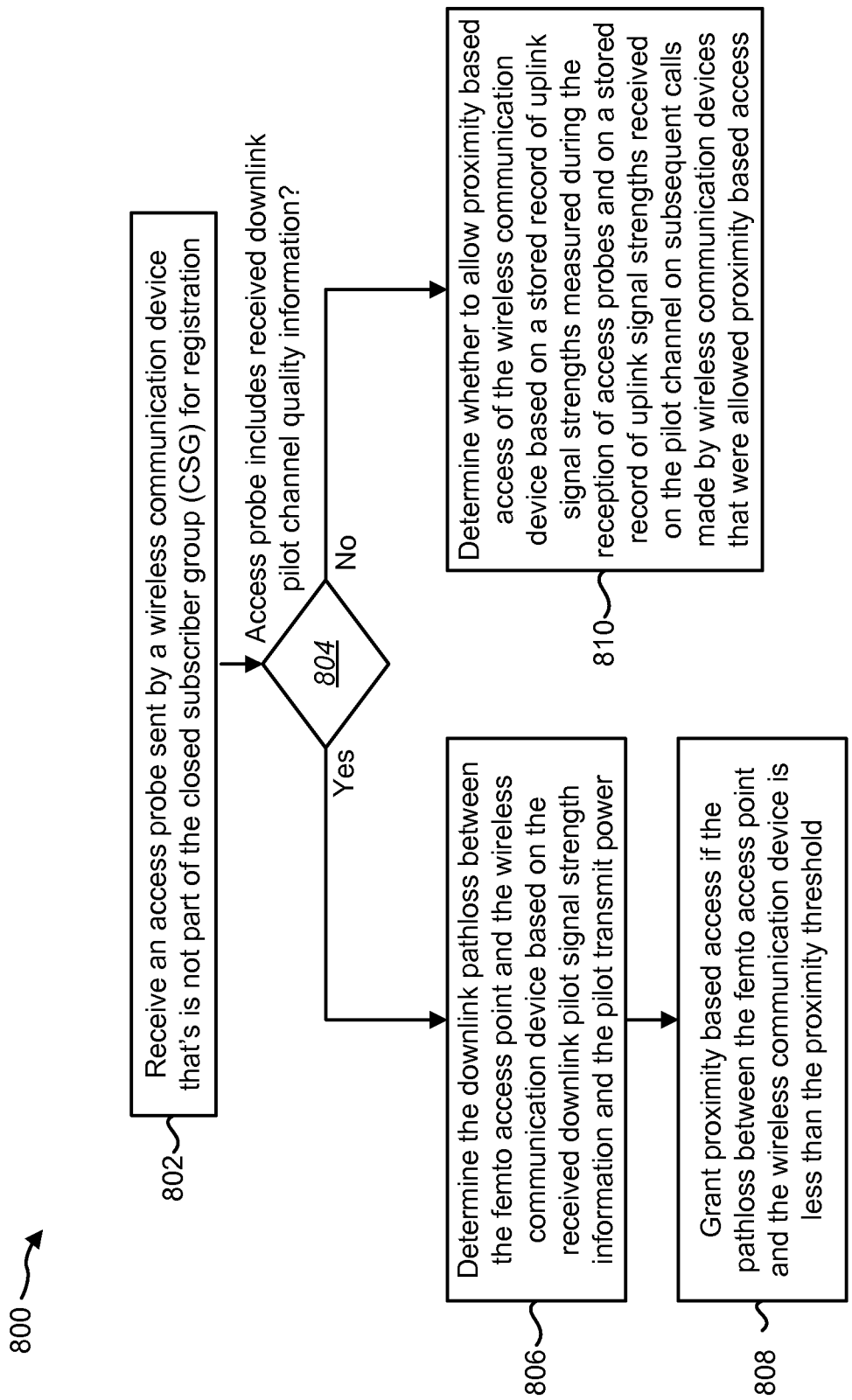
FIG. 8 is a flow diagram of a method for determining whether to allow proximity based access.

FIG. 8 is a flow diagram of a method 800 for determining whether to allow proximity based access. The method 800 may be performed by a femto access point 702. The femto access point 702 may receive 802 an access probe 744 sent by a wireless communication device 706 for registration. The wireless communication device 706 may not be part of the closed subscriber group (CSG) corresponding to the femto access point 702. The femto access point 702 may determine 804 whether the access probe 744 includes received downlink pilot channel quality information 748.

If the access probe 744 includes received downlink pilot channel quality information 748 (e.g., Ecp, Ecp/Io and Io), the femto access point 702 may determine 806 the downlink pathloss 751 between the femto access point 702 and the wireless communication device 706 based on the received downlink pilot energy (Ecp), the pilot strength (Ecp/Io) and total received power (Io) and/or the pilot transmit power (Ecp_tx) 749 known by the femto access point 702. The femto access point 702 may then grant 808 proximity based access of the wireless communication device 706 if the downlink path loss 749 between the femto access point 702 and the wireless communication device 706 is less than the proximity threshold 118.

If the access probe 744 does not include received downlink pilot channel quality information 748, the femto access point 702 may determine 810 whether to allow proximity based access of the wireless communication device 706 based on a stored record 752 of uplink signal strengths measured during the reception of access probes 744 and on a stored record 754 of uplink signal strengths received on the pilot channel on subsequent calls made by wireless communication devices that were allowed proximity based access. Note that even if an access probe 744 includes received downlink pilot channel quality information 748, the femto access point 702 can use the recorded uplink signal strength 752, 754 along with the received downlink pilot channel quality information 748 to make a decision about granting proximity based access.

Figure 9:
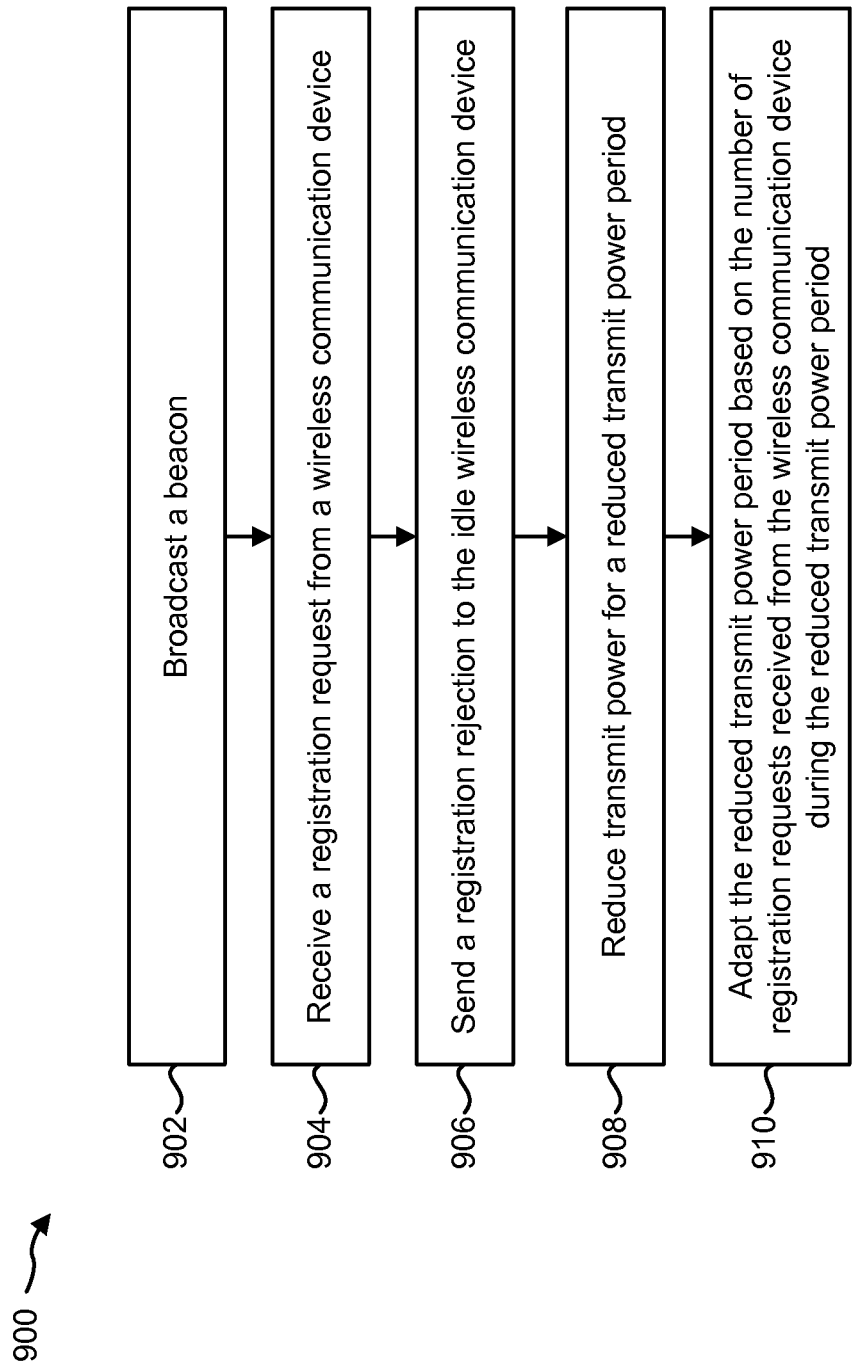
FIG. 9 is a flow diagram of a method for minimizing interference inflicted on a wireless communication device when proximity based access cannot be granted to the wireless communication device.

FIG. 9 is a flow diagram of a method 900 for minimizing interference inflicted on a wireless communication device 706 when proximity based access cannot be granted to the wireless communication device 706. The method 900 may be performed by a femto access point 702. In addition to typical downlink channels, the femto access point 702 may broadcast 902 a beacon. The femto access point 702 may then receive 904 a registration request from an idle wireless communication device 706. The wireless communication device 706 may not be part of the closed subscriber group (CSG) corresponding to the femto access point 702. Thus, the registration request is a proximity based access request. Proximity based access may not be allowed and/or proximity information may not be available. The femto access point 702 or the core network 110 may choose to reject the registration request of the wireless communication device 706.

The femto access point 702 may send 906 a registration rejection 759 to the idle wireless communication device 706. Upon registration rejection, the wireless communication device 706 may bar the femto access point 702 downlink 714 frequency and/or beacon frequency 540 pilot scrambling code (i.e., the pilot pseudorandom noise (PN) code) for a short duration and will not perform idle handoff and registration to a femto access point 702 with this scrambling code. The wireless communication device 706 may also bar the entire downlink 714 frequency and/or beacon for a short duration. However, after the barring period is over, the wireless communication device 706 may again find a strong femto access point 702 downlink pilot signal and/or beacon frequency 540. The wireless communication device 706 may then perform idle handoff to the femto access point 702 and attempt registration again. The femto access point 702 will reject the registration request and the cycle will repeat. This loop may drain the battery life of the wireless communication device 706.

To prevent the loop, the femto access point 702 may reduce the transmit power for a reduced transmit power period 755. The femto access point 702 may reduce 908 the transmit power on different downlink channels such as the pilot channel 322, the overhead (control) channel 324 and traffic channels differently. Or, the femto access point 702 may reduce the total transmit power. The transmit power reduction may be applied on the downlink frequency and/or the beacon frequency 540 (or frequencies). The femto access point 702 may adapt 910 the reduced transmit power period 755 based on the number of registration requests received from the wireless communication device 706 during the reduced transmit power period 755.

For example, if the non closed subscriber group (CSG) wireless communication device 706 is still within the proximity of the femto access point 702 once the femto access point 702 resumes transmission at the normal power level after the reduced transmit power period 755 is over, the wireless communication device 706 may attempt to re-register with the femto access point 702 again. This information can be used to prolong the reduced transmit power period 755. If the number of registration requests received from one or more non closed subscriber group (CSG) wireless communication devices 702 during the reduced transmit power period 755 is high, the reduced transmit power period 755 may be increased and/or the transmit power may be reduced.

Figure 10:
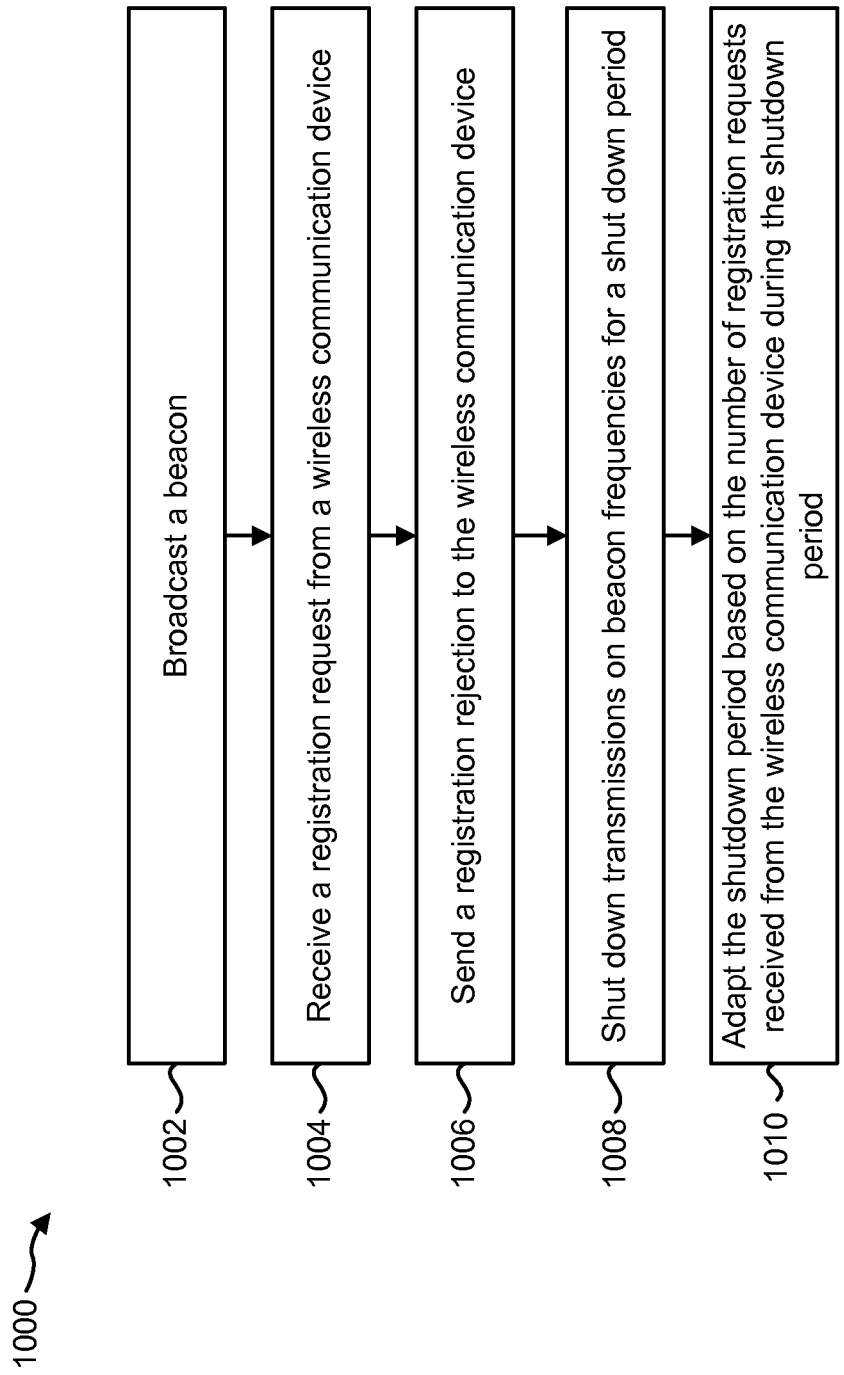
FIG. 10 is a flow diagram of another method for minimizing interference inflicted on a wireless communication device when proximity based access cannot be granted to the wireless communication device.

FIG. 10 is a flow diagram of another method 1000 for minimizing interference inflicted on a wireless communication device 706 when proximity based access cannot be granted to the wireless communication device 706. The method 1000 may be performed by a femto access point 702. The femto access point 702 may broadcast 1002 a beacon. The femto access point 702 may receive 1004 a registration request from a wireless communication device 706. The wireless communication device 706 may not be part of the closed subscriber group (CSG) corresponding to the femto access point 702.

The femto access point 702 may determine to reject the registration request because proximity based access is not allowed, the core network 110 indicates a rejection, not enough proximity based access information is available, etc. The femto access point 702 may send 1006 a registration rejection 759 to the wireless communication device 706. As discussed above, the wireless communication device 706 may then enter a loop of beacon detection, idle handoff, registration request and registration denied. To avoid this loop, the femto access point 702 may shut down 1008 transmissions on beacon frequencies 540 for a shutdown period 757.

Shutting down 1008 the transmissions on beacon frequencies 540 may be especially useful for wireless communication devices 706 that are driving or walking by a home with a femto access point 702. These wireless communication devices 706 will not detect the femto access point 702 after the first registration attempt when they are only in the vicinity of the femto access point 702 for a short duration. The femto access point 702 may adapt 1010 the shutdown period 757 based on the number of registration requests received from the wireless communication device 706 during the shutdown period 757. For example, if the wireless communication device 706 is still within the proximity of the femto access point 702 after the femto access point 702 resumes beacon transmission at a normal power level at the end of the shutdown period 757, the wireless communication device 706 may attempt to re-register with the femto access point 702. This information can be used to prolong the shutdown period 757.

This shutdown mechanism can also be applied to shutdown transmissions on a femto access point downlink frequency when there are no closed subscriber group (CSG) wireless communication devices connected in idle or active state with the femto access point 702. This is useful when a femto access point downlink transmission is causing interference to the downlink of a wireless communication device 706 that is not part of the closed subscriber group (CSG) after the wireless communication device 706 that is not part of the closed subscriber group (CSG) is rejected access by the femto access point 702.

Figure 11:
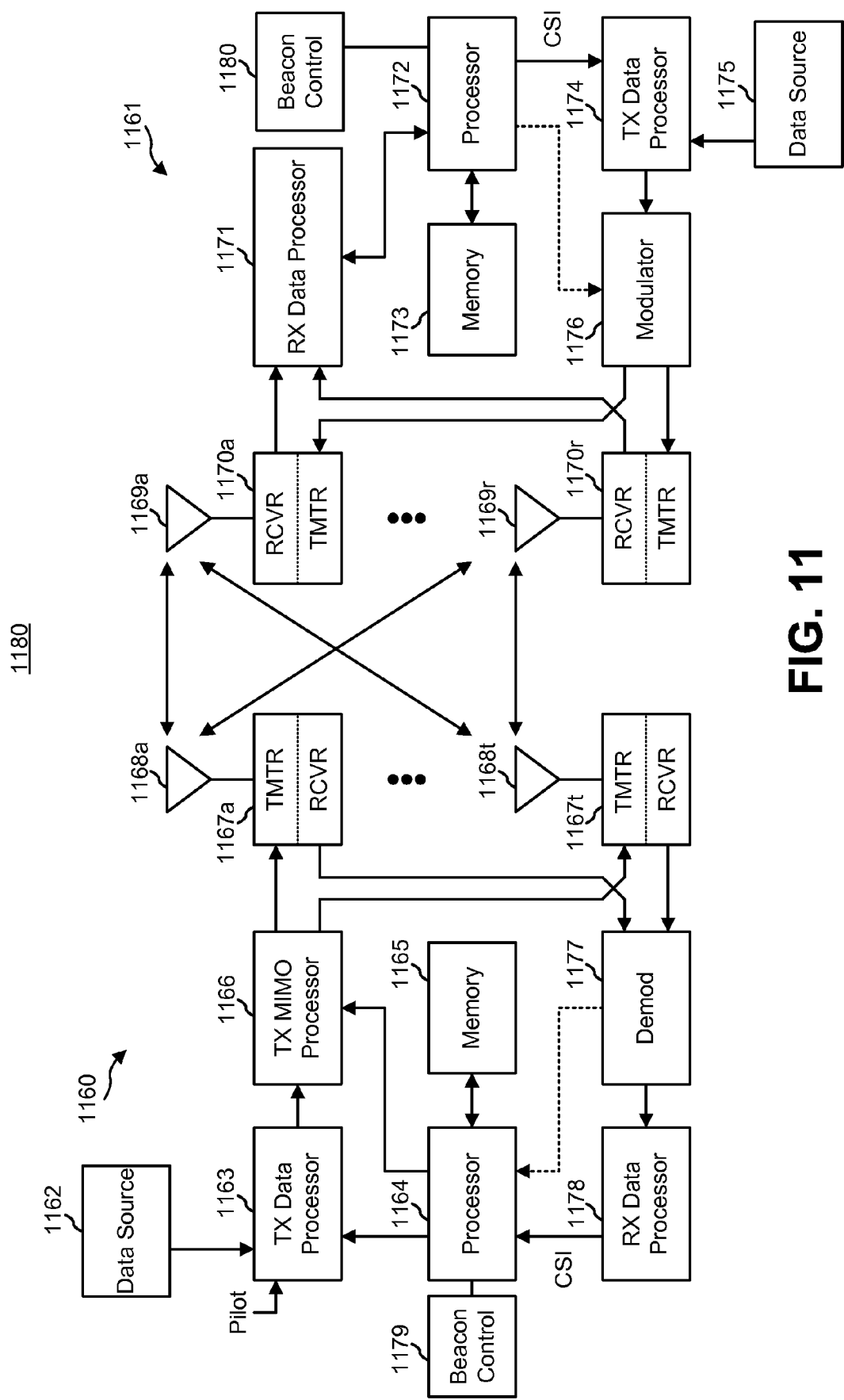
FIG. 11 illustrates two wireless devices in a multiple-in and multiple-out (MIMO) system.

FIG. 11 illustrates two wireless devices in a multiple-in and multiple-out (MIMO) system 1180. A first wireless device 1160 may be a base station and a second wireless device may be a wireless communication device. At the first wireless device 1160, traffic data for a number of data streams is provided from a data source 1162 to a transmit (TX) data processor 1163. Each data stream may then be transmitted over a respective transmit antenna.

The TX data processor 1163 formats, codes and interleaves the traffic data for each data stream based on a particular coding scheme selected for that data stream to provide coded data. The coded data for each data stream may be multiplexed with pilot data using OFDM or other suitable techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding and modulation for each data stream may be determined by instructions performed by a processor 1164. A data memory 1165 may store program code, data and other information used by the processor 1164 or other components of the first wireless device 1160.

The modulation symbols for all data streams are then provided to a TX MIMO processor 1166, which may further process the modulation symbols (e.g., for OFDM). The TX MIMO processor 1166 then provides NT modulation symbol streams to NT transceivers 1167*a* through 1167*t*. In some aspects, the TX MIMO processor 1166 applies beam-forming weights to the symbols of the data streams and to the antenna from which the symbol is being transmitted.

Each transceiver 1167 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1167*a* through 1167*t* are then transmitted from NT antennas 1168*a* through 1168*t*, respectively.

At the second wireless device 1161, the transmitted modulated signals are received by NR antennas 1169*a-r* and the received signal from each antenna 1169 is provided to a respective transceiver (XCVR) 1170*a-r*. Each transceiver 1170 conditions (e.g., filters, amplifies, and downconverts) a respective received signal, digitizes the conditioned signal to provide samples and further processes the samples to provide a corresponding "received" symbol stream.

A receive (RX) data processor 1171 then receives and processes the NR received symbol streams from NR transceivers 1170 based on a particular receiver processing technique to provide NT "detected" symbol streams. The RX data processor 1171 then demodulates, de-interleaves and decodes each detected symbol stream to recover the traffic data for the data stream. The processing by the RX data processor 1171 is complementary to that performed by the TX MIMO processor 1166 and the TX data processor 1163 at the first wireless device 1160.

A processor 1172 periodically determines which pre-coding matrix to use (discussed below). The processor 1172 formulates a reverse link message comprising a matrix index portion and a rank value portion. A data memory 1173 may store program code, data and other information used by the processor 1172 or other components of the second wireless device 1161. The reverse link message may comprise various types of information regarding the communication link and/or the received data stream. The reverse link message is then processed by a TX data processor 1174, which also receives traffic data for a number of data streams from a data source 1175, modulated by a modulator 1176, conditioned by the transceivers 1170*a-r* and transmitted back to the first wireless device 1160.

At the first wireless device 1160, the modulated signals from the second wireless device 1161 are received by the antennas 1166, conditioned by the transceivers 1167, demodulated by a demodulator (DEMOD) 1177 and processed by a RX data processor 1178 to extract the reverse link message transmitted by the second wireless device 1161. The processor 1164 then determines which pre-coding matrix to use for determining the beam-forming weights and then processes the extracted message.

FIG. 11 also illustrates that the communication components may include one or more components that perform beacon-related operations as taught herein. For example, a beacon control component 1179 may cooperate with the processor 1164 and/or other components of the first wireless device 1160 to send beacon signals to another device (e.g., the second wireless device 1161) and to receive beacon signals from another device (e.g., another base station) as taught herein. Similarly, a beacon control component 1180 may cooperate with the processor 1172 and/or other components of the second wireless device 1161 to receive beacon signals from another device (e.g., the first wireless device 1160). It should be appreciated that for each wireless device 1160, 1161, the functionality of two or more of the described components may be provided by a single component. For example, a single processing component may provide the functionality of the beacon control component 1179 and the processor 1164 and a single processing component may provide the functionality of the beacon control component 1180 and the processor 1172.

Figure 12:
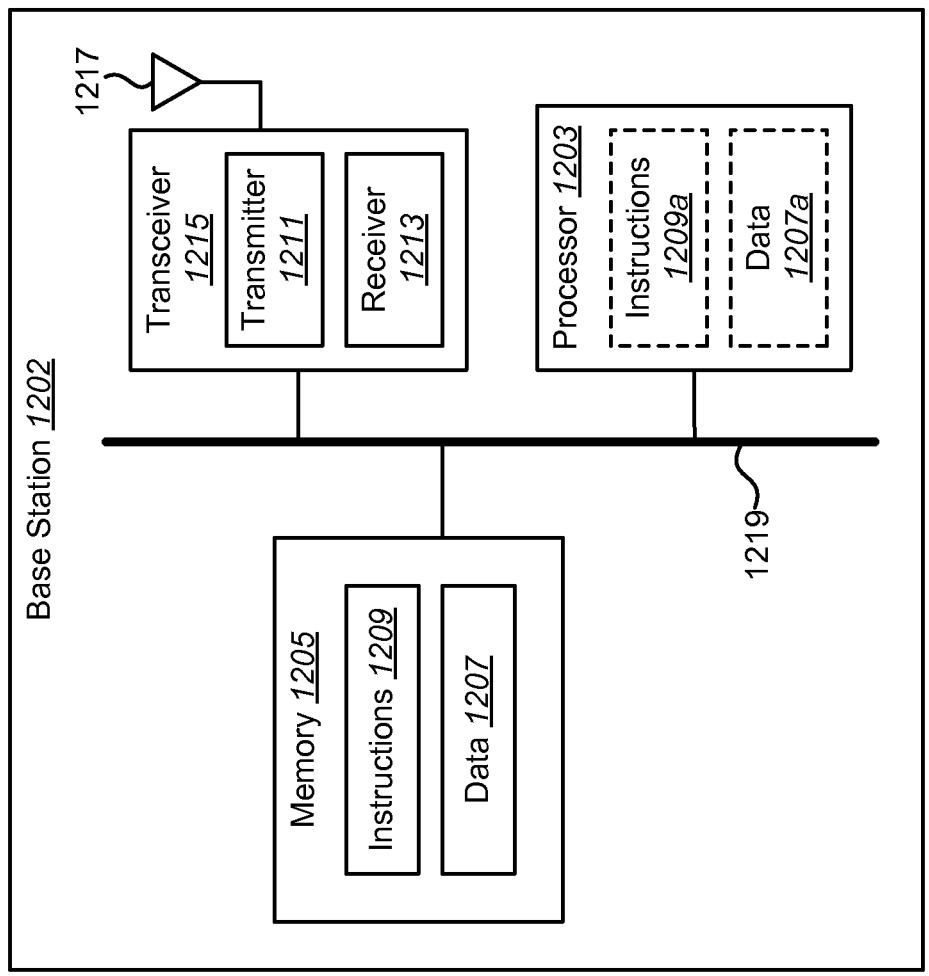
FIG. 12 illustrates certain components that may be included within a base station.

FIG. 12 illustrates certain components that may be included within a base station 1202. A base station may also be referred to as, and may include some or all of the functionality of, an access point, a broadcast transmitter, a NodeB, an evolved NodeB, a femto access point, etc. The base station 1202 includes a processor 1203. The processor 1203 may be a general purpose single- or multi-chip microprocessor (e.g., an ARM), a special purpose microprocessor (e.g., a digital signal processor (DSP)), a microcontroller, a programmable gate array, etc. The processor 1203 may be referred to as a central processing unit (CPU). Although just a single processor 1203 is shown in the base station 1202 of FIG. 12, in an alternative configuration, a combination of processors (e.g., an ARM and DSP) could be used.

The base station 1202 also includes memory 1205. The memory 1205 may be any electronic component capable of storing electronic information. The memory 1205 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1207 and instructions 1209 may be stored in the memory 1205. The instructions 1209 may be executable by the processor 1203 to implement the methods disclosed herein. Executing the instructions 1209 may involve the use of the data 1207 that is stored in the memory 1205. When the processor 1203 executes the instructions 1209, various portions of the instructions 1209*a* may be loaded onto the processor 1203, and various pieces of data 1207*a* may be loaded onto the processor 1203.

The base station 1202 may also include a transmitter 1211 and a receiver 1213 to allow transmission and reception of signals to and from the base station 1202. The transmitter 1211 and receiver 1213 may be collectively referred to as a transceiver 1215. An antenna 1217 may be electrically coupled to the transceiver 1215. The base station 1202 may also include (not shown) multiple transmitters, multiple receivers, multiple transceivers and/or additional antennas.

The various components of the base station 1202 may be coupled together by one or more buses, which may include a power bus, a control signal bus, a status signal bus, a data bus, etc. For the sake of clarity, the various buses are illustrated in FIG. 12 as a bus system 1219.

Figure 13:
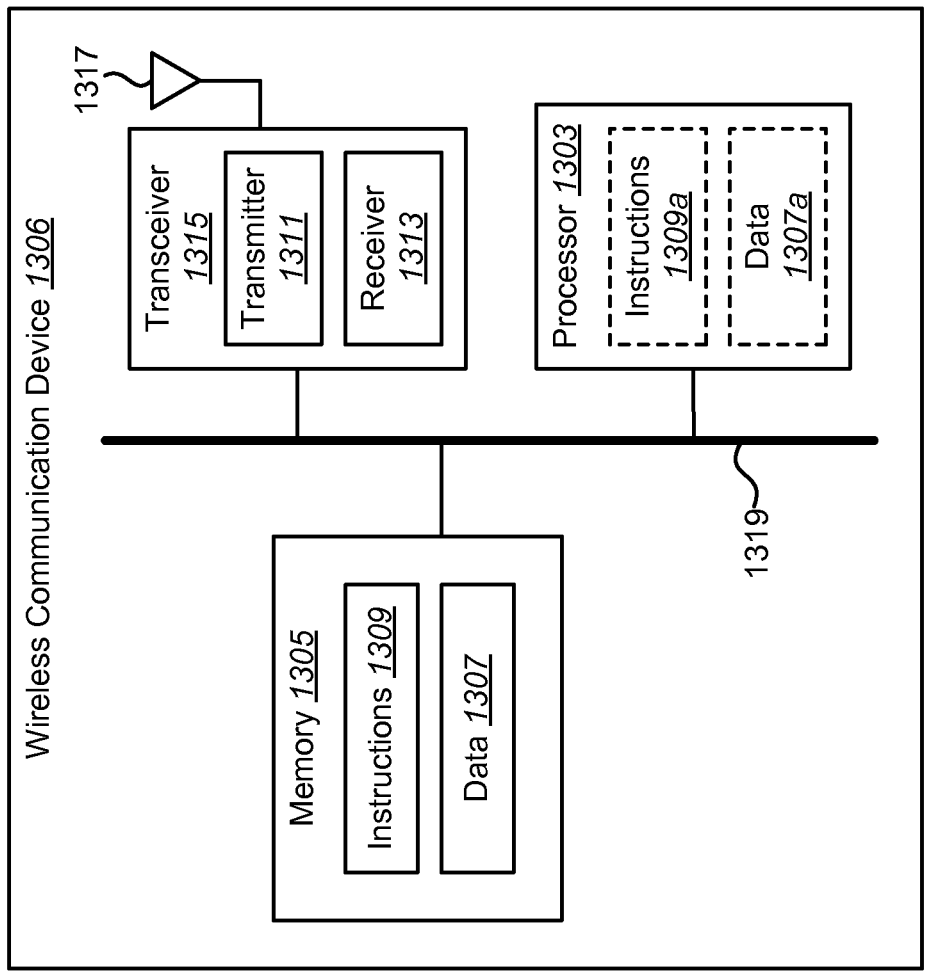
FIG. 13 illustrates certain components that may be included within a wireless communication device.

FIG. 13 illustrates certain components that may be included within a wireless communication device 1306. The wireless communication device 1306 may be an access terminal, a mobile station, a user equipment (UE), etc. The wireless communication device 1306 includes a processor 1303. The processor 1303 may be a general purpose single- or multi-chip microprocessor (e.g., an ARM), a special purpose microprocessor (e.g., a digital signal processor (DSP)), a microcontroller, a programmable gate array, etc. The processor 1303 may be referred to as a central processing unit (CPU). Although just a single processor 1303 is shown in the wireless communication device 1306 of FIG. 13, in an alternative configuration, a combination of processors (e.g., an ARM and DSP) could be used.

The wireless communication device 1306 also includes memory 1305. The memory 1305 may be any electronic component capable of storing electronic information. The memory 1305 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1307 and instructions 1309 may be stored in the memory 1305. The instructions 1309 may be executable by the processor 1303 to implement the methods disclosed herein. Executing the instructions 1309 may involve the use of the data 1307 that is stored in the memory 1305. When the processor 1303 executes the instructions 1309, various portions of the instructions 1309*a* may be loaded onto the processor 1303, and various pieces of data 1307*a* may be loaded onto the processor 1303.

The wireless communication device 1306 may also include a transmitter 1311 and a receiver 1313 to allow transmission and reception of signals to and from the wireless communication device 1306. The transmitter 1311 and receiver 1313 may be collectively referred to as a transceiver 1315. An antenna 1317 may be electrically coupled to the transceiver 1315. The wireless communication device 1306 may also include (not shown) multiple transmitters, multiple receivers, multiple transceivers and/or additional antennas.

The various components of the wireless communication device 1306 may be coupled together by one or more buses, which may include a power bus, a control signal bus, a status signal bus, a data bus, etc. For the sake of clarity, the various buses are illustrated in FIG. 13 as a bus system 1319.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2, 6 and 8-10, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for reducing interference to wireless communication devices, comprising:
   determining a proximity of a wireless communication device to a base station;
   comparing the proximity of the wireless communication device with a proximity threshold; and
   causing a registration response to be sent from the base station to the wireless communication device based on the comparison, wherein the registration response comprises a registration acceptance if the proximity is less than the proximity threshold.

2. The method of claim 1, wherein the base station is a femto access point.

3. The method of claim 1, wherein the proximity of the wireless communication device represents a pathloss from the base station to the wireless communication device, wherein the pathloss is less than the proximity threshold, and wherein causing a registration response to be sent comprises sending the registration response to the wireless communication device.

4. The method of claim 1, wherein the method is performed by a core network.

5. The method of claim 1, further comprising broadcasting a beacon.

6. The method of claim 1, wherein the registration response comprises a registration rejection.

7. The method of claim 1, further comprising allowing active data/voice communication with the wireless communication device.

8. The method of claim 1, wherein the wireless communication device is legacy user equipment (UE).

9. The method of claim 1, further comprising receiving a registration request from the wireless communication device, wherein the wireless communication device is not part of a closed subscriber group (CSG) corresponding to the base station.

10. The method of claim 9, wherein the registration request is part of an access probe.

11. The method of claim 10, wherein the access probe comprises a received downlink pilot channel quality information.

12. The method of claim 11, wherein the proximity is a function of radio frequency (RF) downlink pathloss and is determined using the received downlink pilot channel quality information and a pilot transmit power.

13. The method of claim 9, further comprising:
sending a registration rejection to the wireless communication device; and
reducing downlink transmit power for a reduced transmit power period.

14. The method of claim 13, further comprising adapting the reduced transmit power period and/or transmit power based on how many registration requests are received during the reduced transmit power period.

15. The method of claim 13, wherein reducing the transmit power comprises reducing the transmit power on a pilot channel.

16. The method of claim 13, wherein reducing the transmit power comprises reducing the transmit power on an overhead (control) channel.

17. The method of claim 13, wherein reducing the transmit power comprises reducing the transmit power on all channels.

18. The method of claim 9, further comprising:
sending a registration rejection to the wireless communication device; and
shutting down transmissions on beacon frequencies for a shutdown period.

19. A method for reducing interference to wireless communication devices, comprising:
determining a proximity of a wireless communication device to a base station;
comparing the proximity of the wireless communication device with a proximity threshold;
causing a registration response to be sent to the wireless communication device based on the comparison;
broadcasting a low power beacon during a first cycle, wherein a first time period corresponds to the first cycle;
broadcasting a high power beacon during a second cycle, wherein a second time period corresponds to the second cycle; and
receiving a registration request from the wireless communication device.

20. The method of claim 19, wherein the registration request is received during the first time period, and wherein the registration response is a registration acceptance.

21. The method of claim 20, wherein the method is performed by a base station, and further comprising passing the registration request to a core network along with an indication that the wireless communication device is a likely candidate for proximity based access.

22. The method of claim 19, wherein the registration request is received during the second time period, and wherein the registration response is a registration rejection.

23. The method of claim 22, wherein the method is performed by a base station, and further comprising passing the registration request to a core network along with an indication that the wireless communication device is not a likely candidate for proximity based access.

24. The method of claim 1, wherein the proximity is determined using a record of uplink signal strengths measured during reception of access probes and a record of uplink signal strengths received on a pilot channel on subsequent calls from wireless communication devices that were previously allowed proximity based access.

25. A wireless device configured for reducing interference to wireless communication devices, comprising:
a processor;
memory in electronic communication with the processor;
instructions stored in the memory, the instructions being executable by the processor to:
receive a registration request from a wireless communication device;
in response to the reception of the registration request, determine a proximity of the wireless communication device to the wireless device;
compare the proximity of the wireless communication device with a proximity threshold; and
send a registration response from the wireless device to the wireless communication device based on the comparison, wherein the registration response comprises a registration acceptance if the proximity is less than the proximity threshold.

26. The wireless device of claim 25, wherein the base station is a femto access point.

27. The wireless device of claim 25, wherein the proximity of the wireless communication device represents a pathloss from the base station to the wireless communication device, wherein the pathloss is less than the proximity threshold, and wherein the registration response is a registration acceptance.

28. The wireless device of claim 25, wherein the instructions are further executable to broadcast a beacon.

29. The wireless device of claim 25, wherein the registration response comprises a registration rejection.

30. The wireless device of claim 25, wherein the instructions are further executable to allow active data/voice communication with the wireless communication device.

31. The wireless device of claim 25, wherein the proximity is determined using a record of uplink signal strengths measured during reception of access probes and a record of uplink signal strengths received on a pilot channel on subsequent calls from wireless communication devices that were previously allowed proximity based access.

32. The wireless device of claim 25, wherein the wireless communication device is legacy user equipment (UE).

33. The wireless device of claim 25, wherein the instructions are further executable to receive a registration request from the wireless communication device, wherein the wireless communication device is not part of a closed subscriber group (CSG) corresponding to the wireless device.

34. The wireless device of claim 33, wherein the registration request is part of an access probe.

35. The wireless device of claim 34, wherein the access probe comprises a received downlink pilot channel quality information.

36. The wireless device of claim 35, wherein the proximity is a function of radio frequency (RF) downlink pathloss and is determined using the received downlink pilot channel quality information and a pilot transmit power.

37. The wireless device of claim 33, wherein the instructions are further executable to:
send a registration rejection to the wireless communication device; and reduce downlink transmit power for a reduced transmit power period.

38. The wireless device of claim 37, wherein the instructions are further executable to adapt the reduced transmit power period based on how many registration requests are received during the reduced transmit power period.

39. The wireless device of claim 37, wherein reducing the transmit power comprises reducing the transmit power on a pilot channel.

40. The wireless device of claim 37, wherein reducing the transmit power comprises reducing the transmit power on an overhead (control) channel.

41. The wireless device of claim 37, wherein reducing the transmit power comprises reducing the total transmit power.

42. The wireless device of claim 33, wherein the instructions are further executable to:
   send a registration rejection to the wireless communication device; and
   shut down transmissions on beacon frequencies for a shut-down period.

43. A wireless device configured for reducing interference to wireless communication devices, comprising:
   a processor;
   memory in electronic communication with the processor;
   instructions stored in the memory, the instructions being executable by the processor to:
      receive a registration request from a wireless communication device;
      in response to the reception of the registration request, determine a proximity of the wireless communication device to the wireless device;
      compare the proximity of the wireless communication device with a proximity threshold;
      send a registration response to the wireless communication device based on the comparison;
      broadcast a low power beacon during a first cycle, wherein a first time period corresponds to the first cycle; and
      broadcast a high power beacon during a second cycle, wherein a second time period corresponds to the second cycle.

44. The wireless device of claim 43, wherein the registration request is received during the first time period, and wherein the registration response is a registration acceptance.

45. The wireless device of claim 44, wherein the instructions are further executable to pass the registration request to a core network along with an indication that the wireless communication device is a likely candidate for proximity based access.

46. The wireless device of claim 43, wherein the registration request is received during the second time period, and wherein the registration response is a registration rejection.

47. The wireless device of claim 46, wherein the instructions are further executable to pass the registration request to a core network along with an indication that the wireless communication device is not a likely candidate for proximity based access.

48. A wireless device configured for reducing interference to wireless communication devices, comprising:
   means for receiving a registration request from a wireless communication device;
   in response to receiving the registration request, means for determining a proximity of the wireless communication device to the wireless device;
   means for comparing the proximity of the wireless communication device with a proximity threshold; and
   means for sending a registration response from the wireless device to the wireless communication device based on the comparison, wherein the registration response comprises a registration acceptance if the proximity is less than the proximity threshold.

49. A computer-program product for reducing interference to wireless communication devices, the computer-program product comprising a computer-readable medium having instructions thereon, the instructions comprising:
   code for receiving a registration request from a wireless communication device;
   in response to receiving the registration request, code for determining a proximity of the wireless communication device to a wireless device;
   code for comparing the proximity of the wireless communication device with a proximity threshold; and
   code for causing a registration response to be sent from the wireless device to the wireless communication device based on the comparison, wherein the registration response comprises a registration acceptance if the proximity is less than the proximity threshold.

* * * * *